United States Patent
Hu et al.

(10) Patent No.: US 12,555,265 B2
(45) Date of Patent: Feb. 17, 2026

(54) METHOD FOR DEFINING VALID DIE POSITIONS ON INSPECTION WAFER MAP

(71) Applicant: UNITED MICROELECTRONICS CORP., Hsinchu (TW)

(72) Inventors: Hsiang-Yuan Hu, Tainan (TW); Tzu-Chung Yang, Tainan (TW); Chien-Ting Li, Tainan (TW); Ming-Hsiu Lo, Hsinchu (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 371 days.

(21) Appl. No.: 18/383,054

(22) Filed: Oct. 24, 2023

(65) Prior Publication Data

US 2025/0086829 A1 Mar. 13, 2025

(30) Foreign Application Priority Data

Sep. 7, 2023 (CN) .......................... 202311149865.X

(51) Int. Cl.
*G06K 9/00* (2022.01)
*G06T 7/00* (2017.01)
*G06T 7/62* (2017.01)
*G06T 7/73* (2017.01)

(52) U.S. Cl.
CPC ............. *G06T 7/74* (2017.01); *G06T 7/001* (2013.01); *G06T 7/62* (2017.01); *G06T 2207/10061* (2013.01); *G06T 2207/30148* (2013.01); *G06T 2207/30242* (2013.01)

(58) Field of Classification Search
CPC ................... G06T 7/62; G06T 2207/30148
See application file for complete search history.

(56) References Cited

U.S. PATENT DOCUMENTS

2022/0301136 A1* 9/2022 Hiroi ..................... G06T 7/70

FOREIGN PATENT DOCUMENTS

CN 113342906 A * 9/2021 ............. G06F 16/26

* cited by examiner

*Primary Examiner* — Molly Wilburn
*Assistant Examiner* — Aidan Keup
(74) *Attorney, Agent, or Firm* — WPAT, PC

(57) ABSTRACT

A method for defining valid die positions on an inspection wafer map includes the following steps. A position of a reference die in an inspection wafer map is obtained, and the position of the reference die is adjacent to a center point of the inspection wafer map. A map center data is obtained, and the coordinates of the reference die in the map center data is calculated. A relative offset between the coordinate system of the inspection wafer map and the coordinate system of the map center data is calculated according to the coordinates of the reference die in the map center data. The valid die positions of the map center data are returned to the inspection wafer map and the inspection wafer map is modified to generate a correct valid die map.

11 Claims, 7 Drawing Sheets

METHOD FOR DEFINING VALID DIE POSITIONS ON INSPECTION WAFER MAP

This application claims the benefit of People's Republic of China application Serial No. 202311149865.X, filed Sep. 7, 2023, the subject matter of which is incorporated herein by reference.

BACKGROUND OF THE INVENTION

Field of the Invention

The invention relates in general to a valid die map, and more particularly to a method for defining the valid die positions on inspection wafer map.

Description of the Related Art

Generally speaking, it requires complex processes to manufacture multiple semiconductor chips on a wafer. The first step in the semiconductor manufacturing process is wafer design. It is to transfer the designed circuit diagram to a wafer made of semiconductors. After a series of processes, integrated circuits are formed on the surface of the wafer, and then divided into multiple chips/dies, and finally the chips/dies are packaged and encapsulated to form chip packages.

However, at present, more than tens of thousands of valid dies are manufactured on a single wafer, while invalid dies and test dies are distributed around the edge of the wafer and at specific positions within the wafer. For inspection machines (including defect inspection, electrical inspection, thickness measurement, etc.), the positions of the valid dies must be defined before wafer quality measurements. If the positions of tens of thousands of valid dies are manually selected and invalid dies and test dies are manually eliminated, it must take a long time to do that, and manually selecting and inspecting the total number of valid wafers on the wafer map often make mistakes and cannot be 100% accurate.

SUMMARY OF THE INVENTION

The invention is directed to a method for defining valid die positions on an inspection wafer map to solve problems caused by manual operation.

According to an embodiment of the present invention, a method for defining valid die positions on an inspection wafer map is provided. A position of a reference die on an inspection wafer map is obtained, wherein the position of the reference die is adjacent to a center point of the inspection wafer map. A map center data is obtained and coordinates of the reference die in the map center data is calculated. A relative offset between a coordinate system of the inspection wafer map and a coordinate system of the map center data is calculated based on the coordinates of the reference die in the map center data. The valid die positions in the map center data are returned to the inspection wafer map and the inspection wafer map is modified to generate a correct valid die map.

The above and other aspects of the invention will become better understood with regard to the following detailed description of the preferred but non-limiting embodiment(s). The following description is made with reference to the accompanying drawings.

DETAILED DESCRIPTION OF THE INVENTION

Generally speaking, wafers inevitably have some defects during the manufacturing process. There are many reasons for defects caused on the wafer. Therefore, engineers can observe the electron microscope photos of the defects and the distributions of error dies through the wafer map generated by the wafer inspection results, and then analyze the causes of errors in the manufacturing process. During the inspection process, engineers used to manually find the correct position of the valid dies by observing the wafer map with the naked eye, and eliminate the invalid dies and test dies to avoid interference. Although the manual selection method can ensure high accurate, but lack of efficiency. In view of this, the present invention automatically generates an inspection wafer map through a computer program to quickly define the positions of valid dies on the inspection wafer map, and eliminate invalid dies and test dies, thereby reducing labor costs and error rate in wafer analysis.

Figure 1:
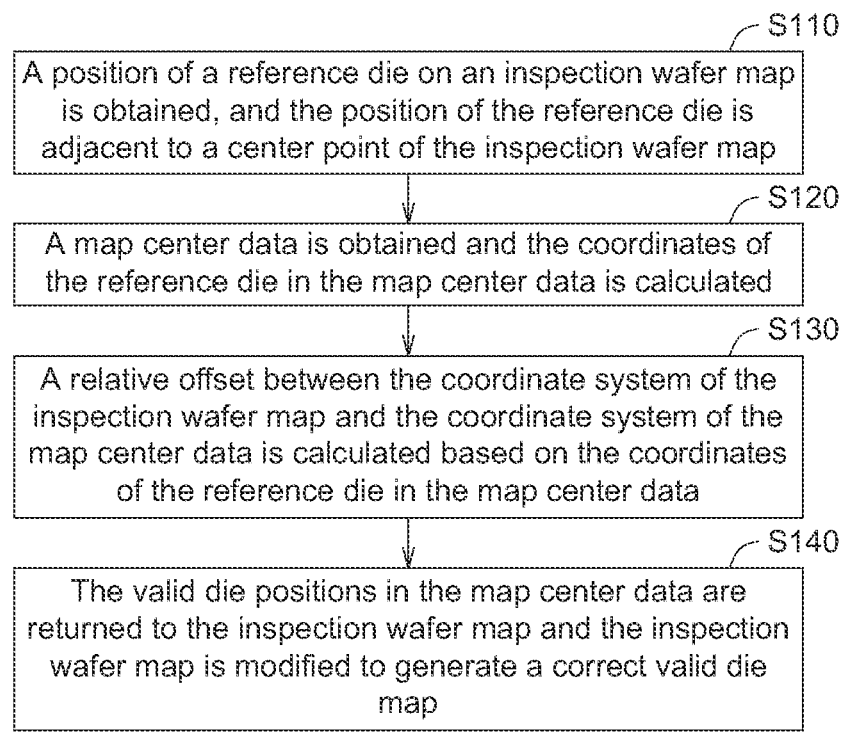
FIG. 1 is a flowchart illustrating a method for defining valid die positions on an inspection wafer map according to an embodiment of the present invention.

Referring to FIG. 1 and FIG. 2A to FIG. 2D. FIG. 1 is a flowchart illustrating a method for defining valid die positions on an inspection wafer map according to an embodiment of the present invention. FIG. 2A to FIG. 2D respectively illustrate schematic diagrams corresponding to various steps of the method in FIG. 1. The method for defining the valid die positions on the inspection wafer map includes the following steps S110 to S140. First, in step S110, a position of a reference die on an inspection wafer map is obtained, wherein the position of the reference die is adjacent to a center point of the inspection wafer map. Step S120, a map center data is obtained and the coordinates of the reference die in the map center data is calculated. Next, in step S130, a relative offset between the coordinate system of the inspection wafer map and the coordinate system of the map center data is calculated based on the coordinates of the reference die in the map center data. Step S140, the valid die positions in the map center data are returned to the inspection wafer map and the inspection wafer map is modified to generate a correct valid die map.

Figure 2A:
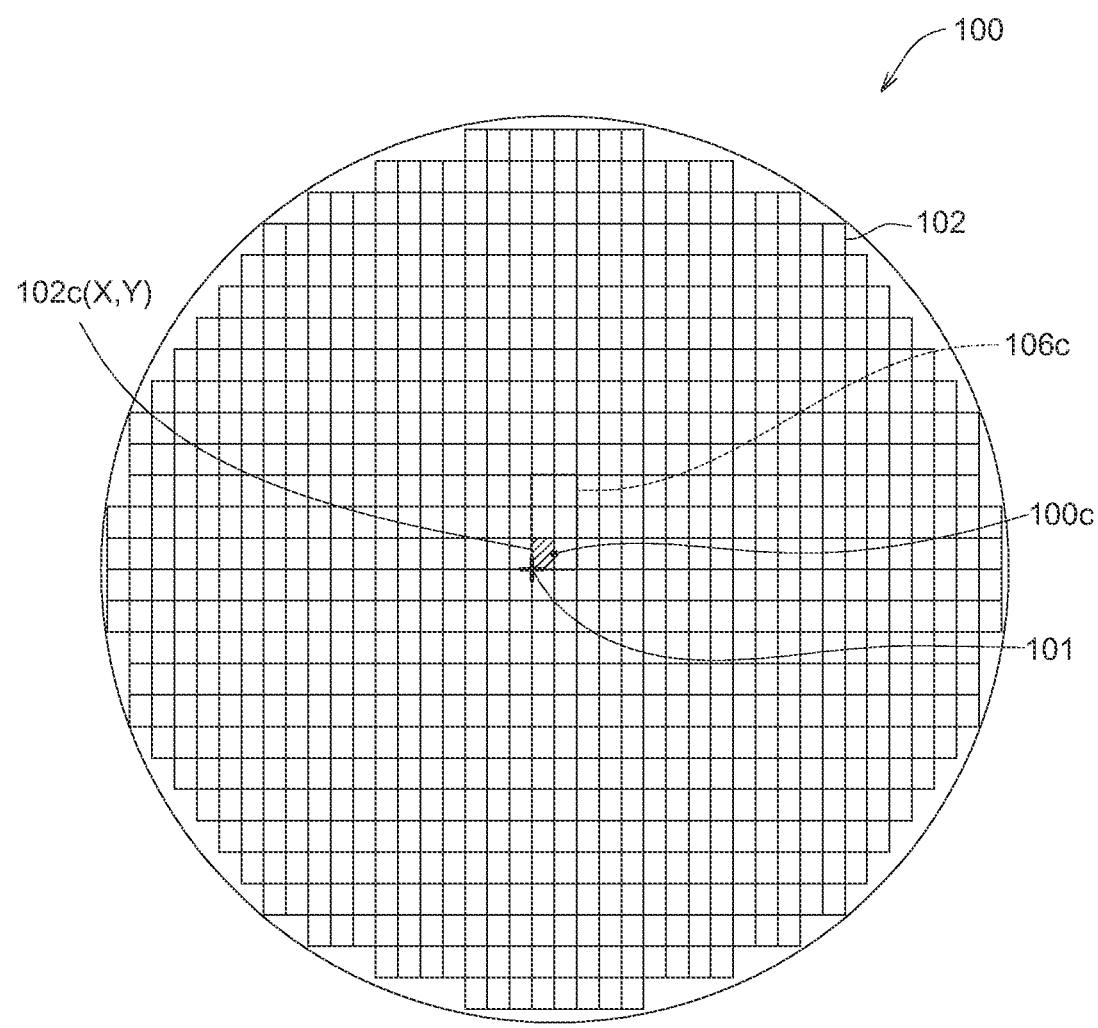
FIGS. 2A to 2D respectively illustrate schematic diagrams corresponding to various steps of the method in FIG. 1.

First, referring to FIG. 2A. according to the die specifications, dies 102 of the same size are generated so that the dies 102 are spread over the entire inspection wafer map 100 to standardize the die size, and each die 102 is numbered in series. Next, the position of the reference die is found from the inspection wafer map 100. Generally speaking, the position of the reference die is, for example, the position of the center die 102c, but it can also be other reference point positions. The center die 102c is, for example, located at the lower left corner of the center shot area 106c. The center shot area 106c represents a size of a reticle pattern, and the reference point 101 of the reticle pattern is located at the lower left corner of the center die 102c, and the reference point 101 is adjacent to the center point 100c of the inspection wafer map 100. Therefore, defining the center die 102c as the reference die can conveniently calculate the actual position/distance of each die 102 relative to the center die 102c. However, the present invention is not limited to take the center die 102c in the lower left corner of the central shot area 106c as the position of the reference die. In another embodiment, it can also be other corners or areas, and the present invention is not limited thereto.

Figure 2B:
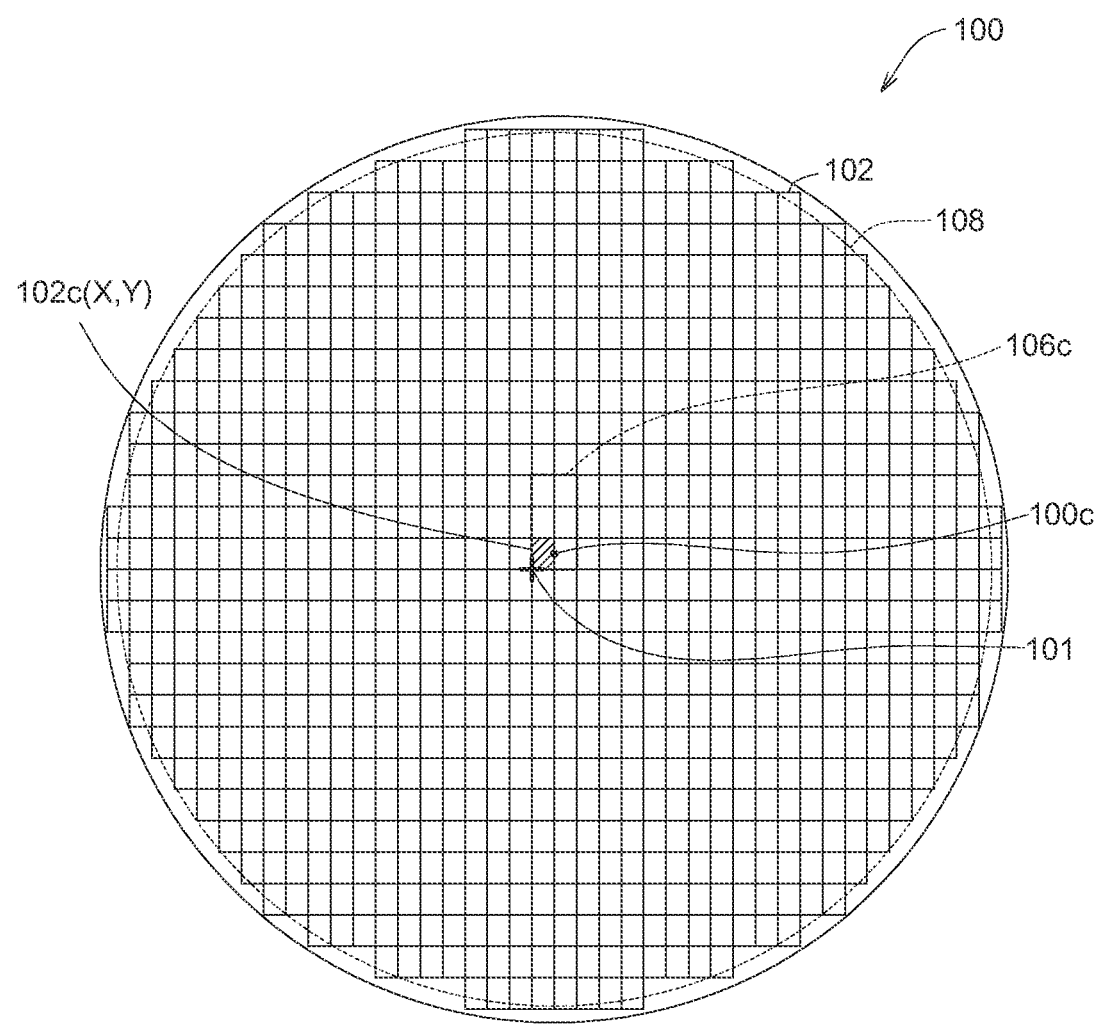
Figure 2C:
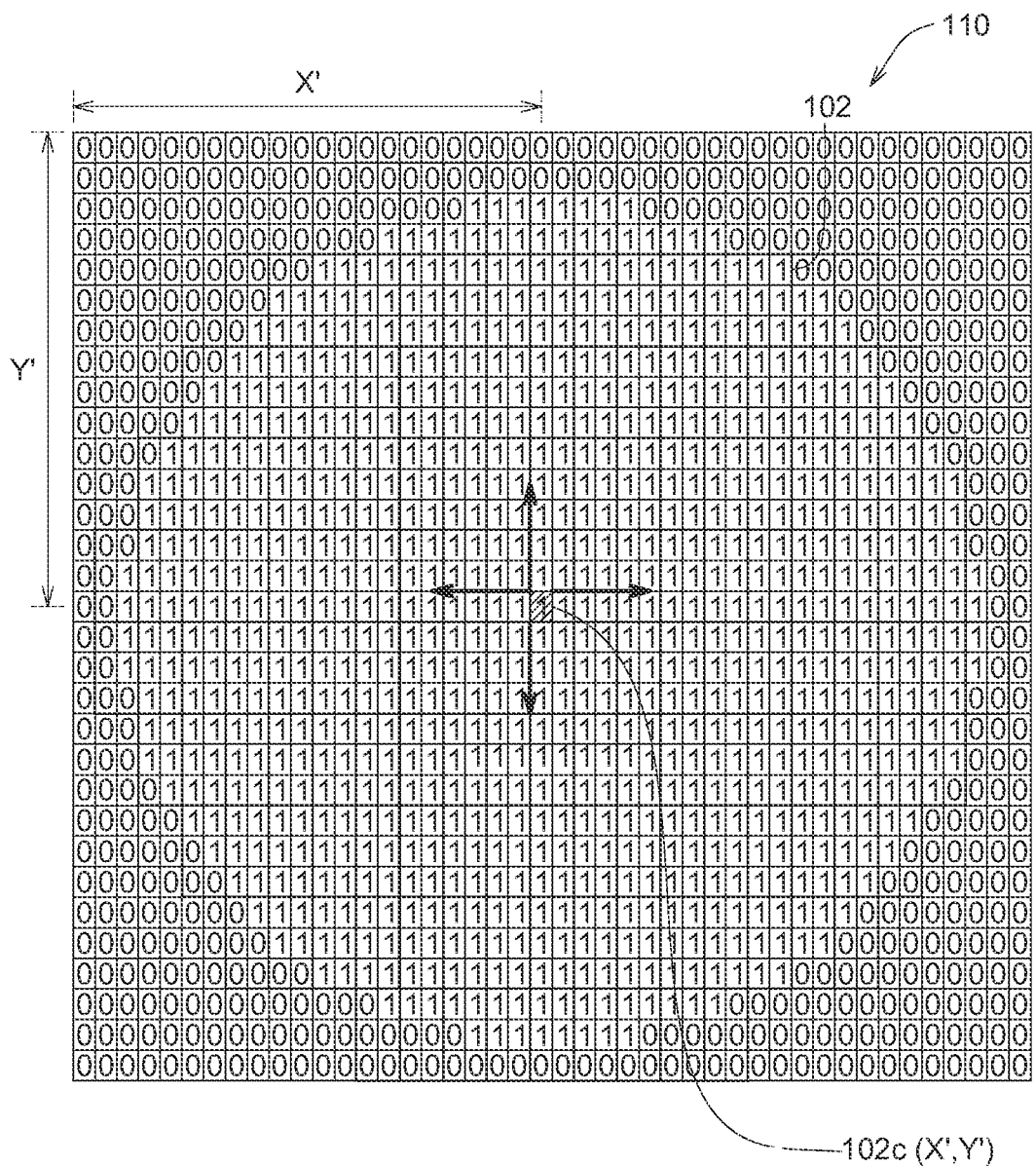

Next, in FIG. 2B, the effective size of the inspection wafer map 100 is defined, where the effective size of the wafer map 100 refers to the effective wafer diameter 108 (the dotted circle in FIG. 2B) that is equal to the original wafer diameter minus the reserved edge size (for example, 3.5 mm). The dies 102 located within the effective size are the valid dies scheduled for product inspection and the test dies used for testing (located at a specific position). The dies 102 located outside the effective size are invalid dies that do not require product inspection. Generally speaking, it takes a long time to manually eliminate invalid dies and test dies, and manual checking of the total number of valid dies on the inspection wafer map 100 often has errors, so that in FIG. 2C, the coordinates (X, Y) of the reference die on the inspection wafer map 100 is read through a computer program in this embodiment, and the coordinates (X', Y') of the reference die in the map center data 110 is calculated, and the valid die positions (as shown in FIG. 2C) in the map center data 110 are returned to the inspection wafer map 100 and the inspection wafer map 100 is modified to generate a correct valid die map. 112. As shown in FIG. 2C, the valid die positions in the map center data 110 is represented by bit 1, while the invalid die position is represented by bit 0, but it is not limited thereto. Through this embodiment, the number of more than tens of thousands of valid dies that have been detected can be calculated without manually checking, and the accuracy is higher than that of manual selection.

Figure 3:
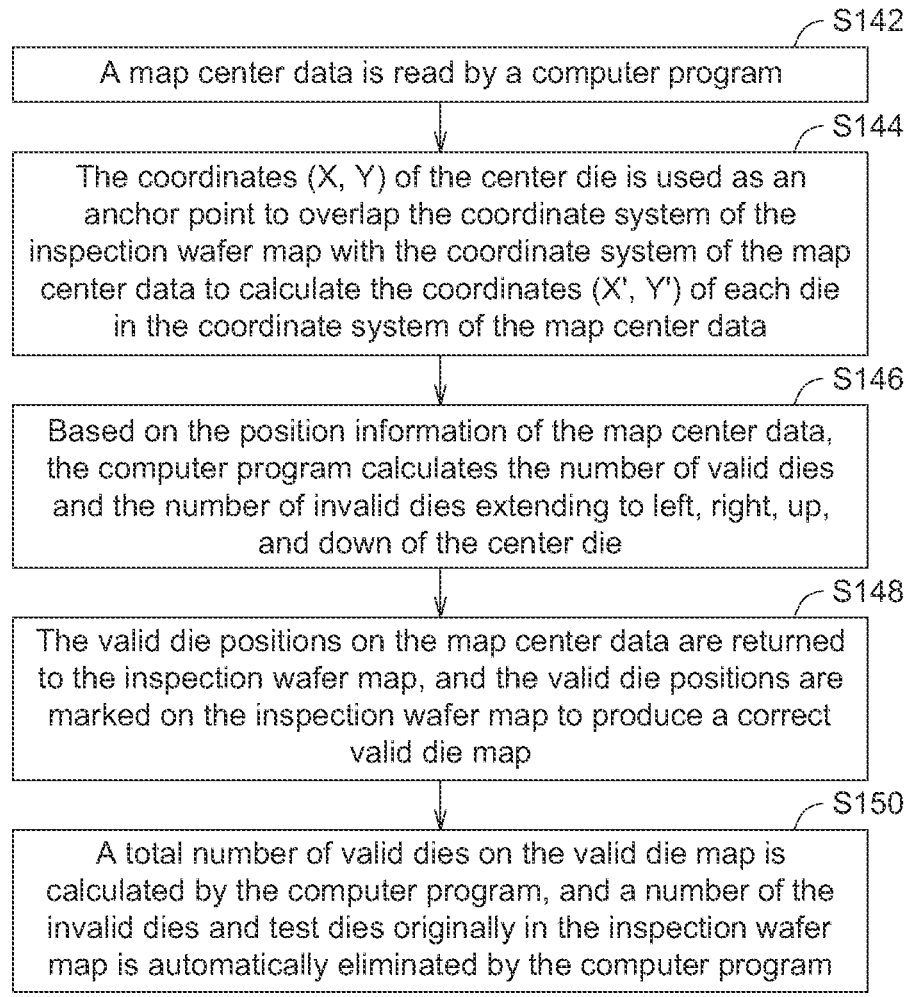
FIG. 3 is a flowchart illustrating a method for combining the position of the reference die on the inspection wafer map with the map center data according to an embodiment of the present invention.

The detailed steps of executing the computer program to generate a valid die map 112 in step S140 are described in steps S142 to S148. Referring to FIG. 3, a flowchart illustrating a method for combining the position of the reference die on the inspection wafer map 100 with the map center data according to an embodiment of the present invention is provided.

Figure 2D:
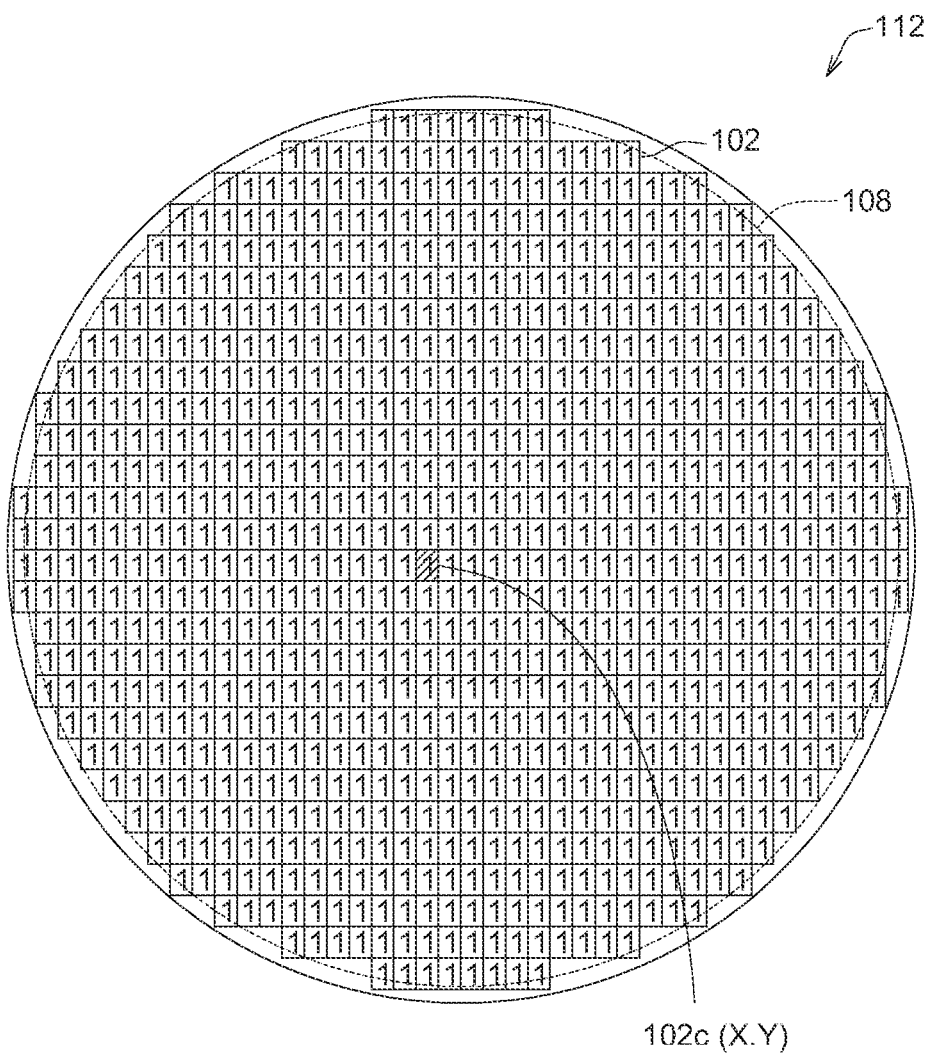

Refer to FIG. 3, in step S142, a computer program is used to read a map center data 110, wherein the map center data 110, for example, collects or stores a same type of die production data in advance, which includes a position information of the dies 102, a valid die/invalid die information, and a relative coordinate information of each die 102 relative to an origin of the coordinate system of the map center data 110 on each of the inspection wafer maps 100 of the same type produced in a previous batch. For example, in FIG. 2B, the coordinates of the center die 102c on the inspection wafer map 100 relative to the origin of the coordinate system of the inspection wafer map 100 (for example, taking the upper left corner of the central shot area 106c as the origin) are, for example, (X, Y), but the coordinates of the center die 102c relative to the origin of the coordinate system of the map center data 110 (for example, taking the upper left corner of the map as the origin) may be (X', Y'), and there are differences between (X, Y) and (X', Y'), so that coordinate system conversion must be performed first. Therefore, in step S144, the coordinates (X, Y) of the center die 102c is used as an anchor point to overlap the coordinate system of the inspection wafer map 100 with the coordinate system of the map center data 110 by the computer program, to calculate the coordinates (X', Y') of each die 102 in the coordinate system of the map center data 110. Next, in step S146, based on the position information of the map center data 110, the computer program calculates the number of valid dies and the number of invalid dies extending to four directions, i.e., left, right, up, and down of the center die 102c. For example, in FIG. 2C, the computer program calculates the number and position of 19 valid dies produced by extending to the left of the center die 102c, and the number and position of 20 valid dies produced by extending to the right of the center die 102c, and so on. By analogy, the number and position of effective dies in the upper and lower directions are as shown above. Next, in step S148, the computer program may return the valid die positions on the map center data 110 of FIG. 2C to the inspection wafer map 100 in FIG. 2B, and mark the valid die positions (for example, represented by bit 1) on the inspection wafer map 100 to produce a correct valid die map 112 (as shown in FIG. 2D). In such way, the method for defining the valid die positions on the inspection wafer map 100 is substantially completed.

In step S150, the above method may also include calculating a total number of valid dies on the valid die map 112 by the computer program, and a number of the invalid dies and test dies originally in the inspection wafer map 100 is automatically eliminated by the computer program. In one embodiment, the computer program can be executed by a processor and/or a computer software, and the computer program can be stored in a memory. The processor may include at least one of a central processing unit (CPU), a digital signal processor (DSP), a microprocessor (MPU), a microcontroller (MCU), standard logic integrated circuits that process digital signals, and application specific integrated circuits (ASIC). The memory may include at least one of a static random access memory (SRAM), a dynamic random access memory (DRAM) and a flash memory, etc.

Figure 4:
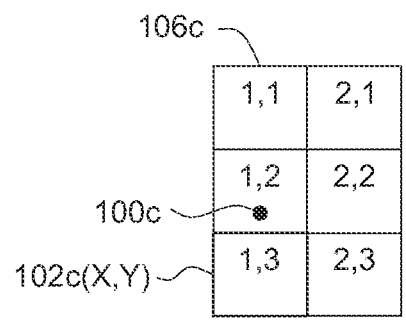
FIG. 4 is a schematic diagram illustrating the coordinates of the center die and the position of the center point of the inspection wafer map.

Referring to FIG. 4, a schematic diagram of the coordinates (X, Y) of the center die 102c and the position of the center point 100c of an inspection wafer map is provided. In one embodiment, the coordinates (X, Y) of the center die 102c may be located at different positions due to the offset caused by the alignment of the exposure machine. Therefore, the relative relationship between the coordinates (X, Y) of the center die 102c and the position of the center point 100c of the inspection wafer map 100 must be calculated based on the offset. For example, in FIG. 4, the coordinates (X, Y) of the center die 102c is (1,3) in the coordinate system of the central shot area 106c, and the position of the center point 100c of the inspection wafer map 100 is located on the coordinates (1,2), according to the offset calculation formula (−m+1,−b+n), it can be known that the coordinates (X, Y) of the center die 102c are offset by (0,−1) relative to the center point 100c of the inspection wafer map 100. That is, the X coordinate of the position where the center point 100c is located is set to m, the Y coordinate of the position where the center point 100c is located is set to n, and the Y coordinate of the position where the center die 102c is located is set to b, and the parameters m, n, and b are taken into the offset calculation formula (−m+1,−b+n) to get the offset (−1+1, −3+2)=(0,−1). The above position offset (0,−1) can be stored in the map center data 110 in advance for table lookup. Since the position offset of the center die 102c of the same type under the same process parameters is substantially the same, there is no need to recalculate the position of the center die 102*c*.

Therefore, according to the map center data 110, the computer program can quickly find the position offset of the coordinates (X, Y) of the center die 112*c* relative to the center point 100*c* of the inspection wafer map 100. If the offset is (0,−1), indicating that the center die 112*c* is located at a coordinate point below the center point 100*c*. Therefore, the computer program can correctly calculate the position of the center die 112*c* in the map center data 110 according to the offset calculation formula.

In step S150, the invalid die includes unqualified die, the dies outside the effective size of the inspection wafer map 100, and test dies used to test the performance of the dies. In addition, in FIGS. 5A and 5B, calculating the total number of valid dies may include calculating a number of merged first die 103*a* and second die 103*b*, where the first die 103*a* and the second die 103*b* are merged to a single die. The size of first die 103*b* and the size of the second die 103*b* are, for example, smaller than a preset die size that cannot be checked by the human eye of an operator (for example, less than 1150 microns). The size of the merged die is increased by merging the first die 103*a* and the second die 103*b*.

Figure 5A:
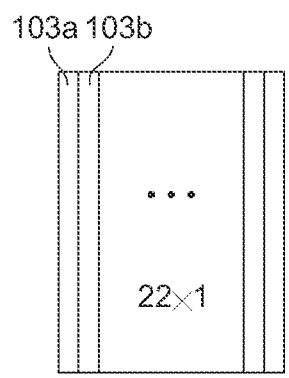
FIGS. 5A and 5B respectively are schematic diagrams of die sizes before and after merging a first die and a second die.
Figure 5B:
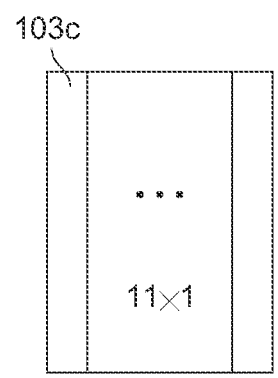

Referring to FIG. 5A and FIG. 5B, schematic diagrams of die sizes before and after merging a first die and a second die are provided. The number of dies in a single shot area before merging is, for example, 22×1. After merging, the number of dies in a single shot area is 11×1. Calculating the numbers of the first die 103*a* and the second die 103*b*, for example, is to merge the smaller first die 103*a* and the second die 103*b* into a larger third die 103*c*, in addition to calculate the number of the larger third die 103*c*, the original number of the first dies 103*a* and the number of the second dies 103*b* before merge are calculated based on the merged data (such as two-in-one or three-in-one) to obtain a correct number of valid dies.

The above-mentioned embodiments of the present invention disclose a method for defining the valid die positions on the inspecting wafer map. There is no need to manually check more than tens of thousands of valid dies that have been detected, and there is no need to manually eliminate invalid dies and test dies, the above operation only needs to be completed through a computer program, so that a lot of time can be saved, and through the method for defining the valid die positions on the inspection wafer map in this embodiment, the accuracy can be improved, for example, to achieve even 100% accuracy.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for defining valid die positions on an inspection wafer map, comprising:
    obtaining a position of a reference die in an inspection wafer map, wherein the position of the reference die is adjacent to a center point of the inspection wafer map;
    obtaining a map center data and calculating coordinates of the reference die in the map center data;
    calculating a relative offset between a coordinate system of the inspection wafer map and a coordinate system of the map center data based on the coordinates of the reference die in the map center data; and
    returning valid die positions on the map center data to the inspection wafer map and modifying the inspection wafer map to generate a correct valid die map.

2. The method according to claim 1, wherein the reference die is a center die, and the position of the center die is defined as a lower left corner of a central shot area, and the center shot area represents a size of a reticle pattern.

3. The method according to claim 1, further comprising defining an effective size of the inspection wafer map as an effective wafer diameter in which an original wafer diameter minus a reserved edge size, and dies within the effective size are defined as a valid die or a test die, and dies outside the effective size are defined as an invalid die.

4. The method according to claim 1, wherein generating the correct valid die map comprises:
    using a computer program to read the map center data;
    wherein the computer program uses the coordinates (X, Y) of a center die as an anchor point and superimposes the coordinate system of the inspection wafer map with the coordinate system of the map center data to calculate the coordinates (X', Y') of each die on the inspection wafer map in the coordinate system of the map center data;
    based on the location information of the map center data, the computer program calculates a number of valid dies and a number of invalid dies extending to left, right, up, and down directions of the center die; and
    returning the valid die positions to the inspection wafer map, and marking the valid die positions on the inspection wafer map to generate the correct valid die map.

5. The method according to claim 4, wherein generating the correct valid die map further comprises:
    calculating a total number of valid dies on the valid die map by the computer program, and automatically eliminating a number of invalid dies and test dies originally in the inspection wafer map.

6. The method according to claim 4, wherein the map center data is used to collect or store a same type of die production data in advance, comprising a position information of the dies, a valid die/invalid die information, and a relative coordinate information of each die relative to an origin of the coordinate system of the map center data on each of the inspection wafer maps of the same type produced in a previous batch.

7. The method according to claim 4, wherein the coordinates (X, Y) of the center die are obtained through a coordinate system conversion to determine the coordinates (X', Y') of the center die in the coordinate system of the map center data.

8. The method according to claim 4, wherein the computer program calculates an offset of the coordinates (X, Y) of the center die relative to a center point of the inspection wafer map according to an offset calculation formula and stores the offset in the map center data for table lookup.

9. The method according to claim 8, wherein the computer program calculates the coordinates (X', Y') of the center die in the coordinate system of the map center data according to the offset.

10. The method according to claim 5, wherein calculating the total number of valid dies comprises calculating a number of merged first and second dies, and then calculating a number of the first die and a number of the second die before merge based on the merged data.

11. The method according to claim 10, wherein a size of the first die and a size of the second die are smaller than a preset die size that cannot be checked by the human eye of an operator.

* * * * *